United States Patent
Watkins (10) Patent No.: US 11,075,667 B1
(45) Date of Patent: Jul. 27, 2021

(54) TUNEABLE RAT-RACE COUPLER FOR SINGLE ANTENNA FULL DUPLEX

(71) Applicant: Kabushiki Kaisha Toshiba, Minato-ku (JP)

(72) Inventor: Gavin Tomas Watkins, Bristol (GB)

(73) Assignee: Kabushiki Kaisha Toshiba, Minato-ku (JP)

( * ) Notice: Subject to any disclaimer, the term of this patent is extended or adjusted under 35 U.S.C. 154(b) by 0 days.

(21) Appl. No.: 16/812,915

(22) Filed: Mar. 9, 2020

(51) Int. Cl.
*H04B 1/48* (2006.01)
*H04L 5/14* (2006.01)
*H04B 7/0413* (2017.01)

(52) U.S. Cl.
CPC ............. *H04B 1/48* (2013.01); *H04B 7/0413* (2013.01); *H04L 5/14* (2013.01)

(58) Field of Classification Search
CPC ................................ H01P 5/222; H04B 1/525
See application file for complete search history.

(56) References Cited

U.S. PATENT DOCUMENTS

| | | | | |
|---|---|---|---|---|
| 7,639,102 | B2* | 12/2009 | Wagner | H03H 7/461 333/120 |
| 8,742,981 | B2* | 6/2014 | Jungmaier | G01S 7/034 342/175 |
| 10,644,763 | B1* | 5/2020 | Watkins | H04B 1/1607 |
| 2015/0180590 | A1* | 6/2015 | Wagner | H04B 1/40 455/90.2 |
| 2015/0341011 | A1* | 11/2015 | Ding | H03H 7/18 333/120 |
| 2017/0358857 | A1* | 12/2017 | Watkins | H01Q 3/26 |
| 2020/0099350 | A1* | 3/2020 | Dani | H03G 3/3036 |
| 2020/0136572 | A1* | 4/2020 | Watkins | H03F 1/0205 |

FOREIGN PATENT DOCUMENTS

| | | |
|---|---|---|
| DE | 10 2009 045 546 A1 | 5/2010 |
| GB | 2551346 A | 12/2017 |

OTHER PUBLICATIONS

Meng Cai, et al., "A 15GHz Full Duplex System for Microwave Backhauling", 2015 IEEE 81st Vehicular Technology Conference (VTC Spring), 2015, 5 pages.
Mohamed F. Hagag, et al., "A Compact Tunable Filtering Rat-Race Coupler", 2018 IEEE/MTT-S International Microwave Symposium, 2018, pp. 1118-1121.
Xiangguan Tan, et al., "A Novel Rat-Race Coupler With Widely Tunable Frequency", IEEE Transactions on Microwave Theory and Techniques, vol. 67, No. 3, Mar. 2019, pp. 957-967.

* cited by examiner

*Primary Examiner* — Devan A Sandiford
(74) *Attorney, Agent, or Firm* — Oblon, McClelland, Maier & Neustadt, L.L.P.

(57) ABSTRACT

A full duplex system includes a first port connected to an antenna, a second port connected to a source of a signal to be transmitted via the antenna, and a third port for outputting a signal received via the antenna. The tuneable rat-race coupler includes a plurality of arms, and a variable phase shifting and attenuation circuitry in a first arm of the plurality of arms to enable cancellation at the third port of a reflected signal produced by the antenna.

17 Claims, 8 Drawing Sheets

FIG. 1

PRIOR ART

FIG. 2

PRIOR ART

FIG. 3

PRIOR ART

TUNEABLE RAT-RACE COUPLER FOR SINGLE ANTENNA FULL DUPLEX

FIELD

Embodiments described herein relate generally to tuneable rat-race couplers and, more generally, to tuneable rat-race couplers for Full Duplex (FD) systems.

BACKGROUND

Full Duplex (FD) is the simultaneous transmission and reception (STAR) of wireless signals on the same frequency at the same time and is still a relatively new technology. FD has been approved as an option for the 802.11ax WiFi standard, and is being investigated for mobile phone applications by a number of technology companies.

In the following, embodiments will be described with reference to the drawings in which.

DETAILED DESCRIPTION

According to a first aspect of the invention there is provided a full duplex system comprising a tuneable rat-race coupler with a first port connected to an antenna, a second port connected to a source of a signal to be transmitted via the antenna, a third port for outputting a signal received via the antenna, the tuneable rat-race coupler comprising a plurality of arms, and a variable phase shifting and attenuation circuitry in a first arm of the plurality of arms to enable the cancellation at the third port of a reflected signal produced by the antenna.

In an embodiment, the variable phase shifting and attenuation circuitry is configured to produce a cancellation signal that is equal in magnitude but opposite in phase to the reflected signal so that the signals cancel at the third port of the tuneable rat-race coupler.

In an embodiment the first arm is between the second port and third port, the first arm comprising a first transmission line, the tuneable rat-race coupler further comprising a second arm between the first port and the second port, the second arm comprising a second transmission line, and a third arm between the first port and the third port, the third arm comprising a third transmission line.

In another embodiment the first arm is between the second port and third port, the tuneable rat-race coupler further comprising a second arm between the first port and the second port, the second arm comprising a second transmission line, and a third arm between the first port and the third port, the third arm comprising a third transmission line.

In an embodiment the variable phase shifting and attenuation circuitry comprises a Tr-type attenuator.

In an embodiment the variable phase shifting and attenuation circuitry comprises a hybrid coupler.

In an embodiment the variable phase shifting and attenuation circuitry comprises a quadrature mixer.

In an embodiment, the quadrature mixer comprises a first power splitter configured to split a signal via two signal paths, each signal path comprising a mixer, The quadrature mixer further comprises a second power splitter to combine the signals from the two signal paths.

According to an embodiment, the rat-race coupler comprises a phase-inverter.

In an embodiment, the full duplex system further comprises control circuitry connected to the variable phase shifting and attenuation circuitry.

In an embodiment, the full duplex system comprises a controller configured to control the variable phase shifting and attenuation circuitry.

In an embodiment the system is a mobile phone, a WiFi router, a mobile phone basestation, a wireless power transfers system or a mmWave wireless backhaul.

In a second aspect of the inventions there is provided a full duplex MIMO system comprising two or more full duplex systems as described above.

In an embodiment, the full duplex MIMO system comprises a phase shifter and an attenuator between the two or more full duplex systems.

In a third aspect of the invention, there is provided a tuneable rat-race coupler for use in the full duplex system described above.

In a fourth aspect of the invention, there is provided a tuneable rat-race coupler comprising a first port configured to be connected to a source of a first signal, a second port configured to output the first signal and to receive a second signal, a third port configured to output the second signal, a plurality of arms, and a variable phase shifting and attenuation circuitry in a first arm of the plurality of arms to enable the cancellation at the third port of a third signal generated at the second port.

In an embodiment, the variable phase shifting and attenuation circuitry is configured to produce a cancellation signal that is equal in magnitude but opposite in phase to the third signal so that the cancellation signal and third signal cancel at the third port.

In one embodiment, the first arm between the first port and third port, the first arm comprising a first transmission line, the tuneable rat-race coupler further comprising a second arm between the first port and the second port, the second arm comprising a second transmission line, and a third arm between the second port and the third port, the third arm comprising a third transmission line.

In one embodiment, the first arm between the first port and third port, the tuneable rat-race coupler further comprising a second arm between the first port and the second port, the second arm comprising a second transmission line, and a third arm between the second port and the third port, the third arm comprising a third transmission line.

In an embodiment the variable phase shifting and attenuation circuitry comprises a Tr-type attenuator.

In an embodiment the variable phase shifting and attenuation circuitry comprises a hybrid coupler.

In an embodiment the variable phase shifting and attenuation circuitry comprises a quadrature splitter connected, via two signal paths, to a quadrature mixer, the two signal paths configured to be individually attenuatable.mixer.

In one embodiment, the quadrature mixer comprises a first power splitter configured to split a signal via two signal paths, each signal path comprising a mixer. The quadrature mixer further comprises a second power splitter to combine the signals from the two signal paths.

In an embodiment the tuneable rat-race coupler further comprises a phase-inverter.

In an embodiment, the variable phase shifting and attenuation circuitry is configured to be connected to control circuitry.

Figure 1:
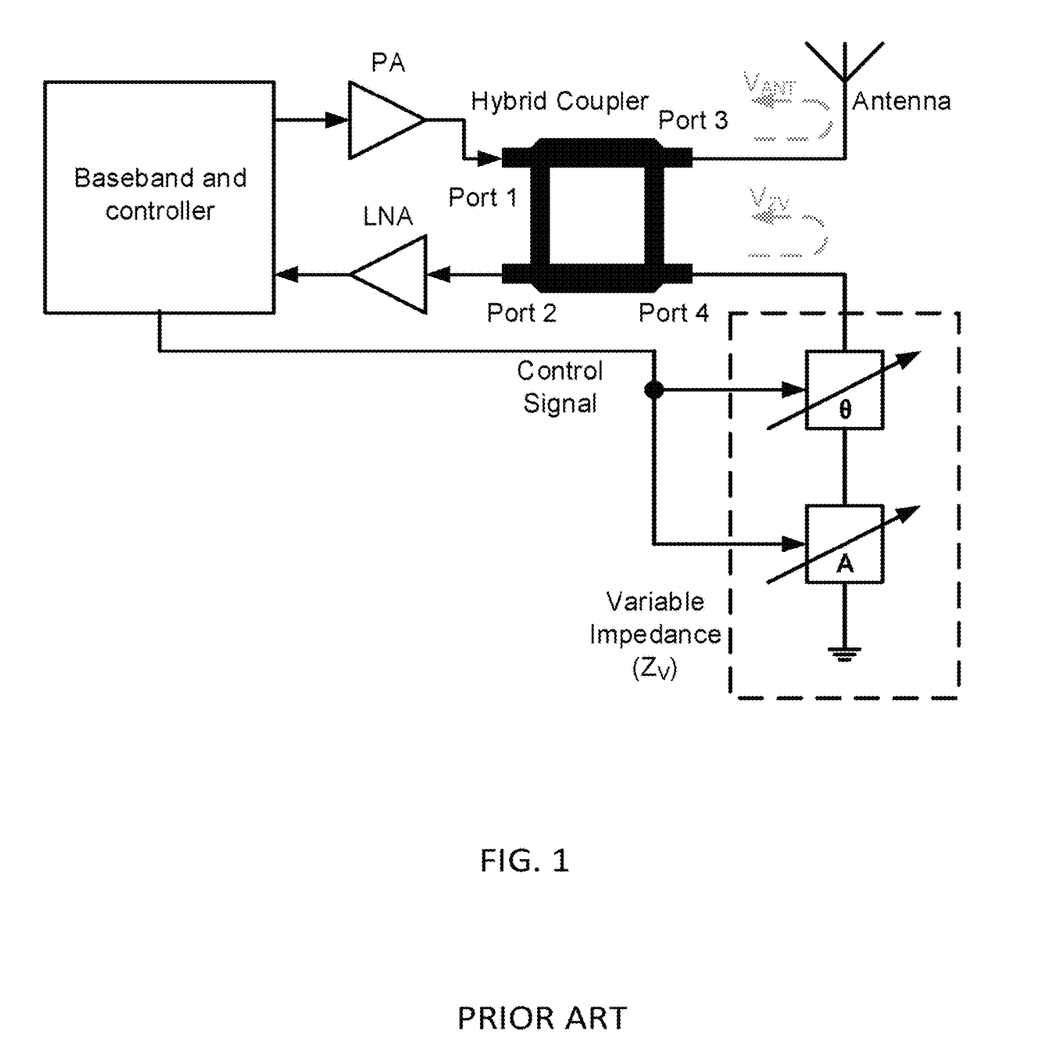
FIG. 1 shows a known FD system.

FIG. 1 shows a known STAR system comprising a baseband and controller that provides an output signal that is to be transmitted to a power amplifier (PA). The amplified signal is applied to an input port (Port 1) of a Hybrid Coupler. The Hybrid coupler outputs the amplified transmission signal to the Antenna via Port 3. Signal received by the antenna enters the Hybrid Coupler at Port 3 and is output to the low noise amplifier (LNA) and, from there, transmitted to the baseband and controller.

Antennas have a finite return-loss due to their mismatch, causing a portion of the transmit signal ($V_{ANT}$) to be reflected back into the combining network, as shown in FIG. 1. This reflected signal is transmitted to the LNA in the same manner as a signal received by the antenna to interfere with the received signal. This reflected signal therefore forms part of the self-interference of the system along with the inherent leakage of the combining network. The fourth port of Hybrid Couplers is often terminated with the characteristic impedance of the transmission lines used in the system. In FIG. 1, however, a variable impedance $Z_v$ is instead connected to port 4 of the Hybrid Coupler. $Z_v$'s function is to produce a correction signal ($V_{ZV}$) with the appropriate magnitude (or amplitude) and phase to cancel the self-interference. In FIG. 1 $Z_V$ is composed of the series combination of a variable phase shifter, variable attenuator and short circuit. The signal output at Port 4 of the Hybrid Coupler is phase shifted and attenuated by a variable amount that can be set by the controller. The signal is reflected by the short circuit and propagates back to Port 4 of the Hybrid Coupler via the variable attenuator and phase shifter.

Figure 2:
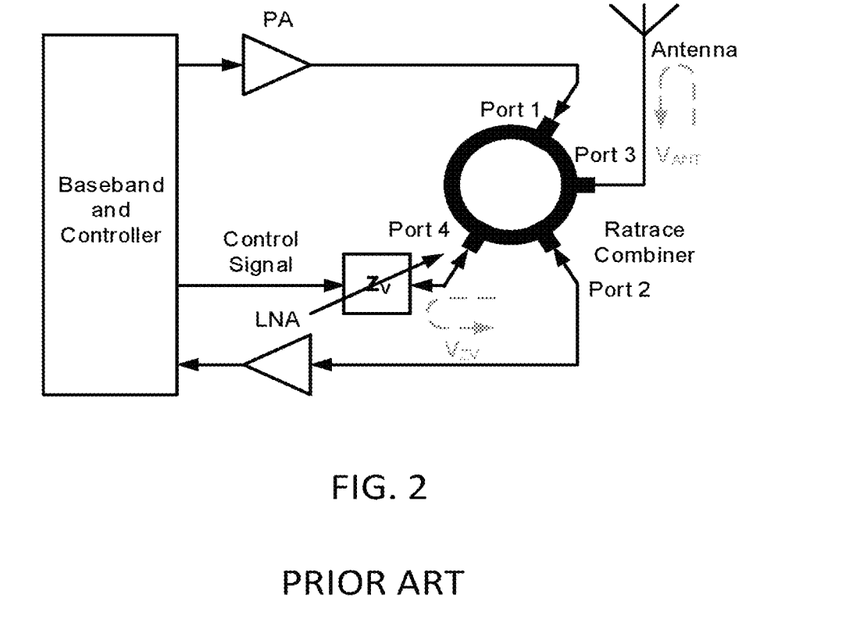
FIG. 2 shows a known FD system.
Figure 3:
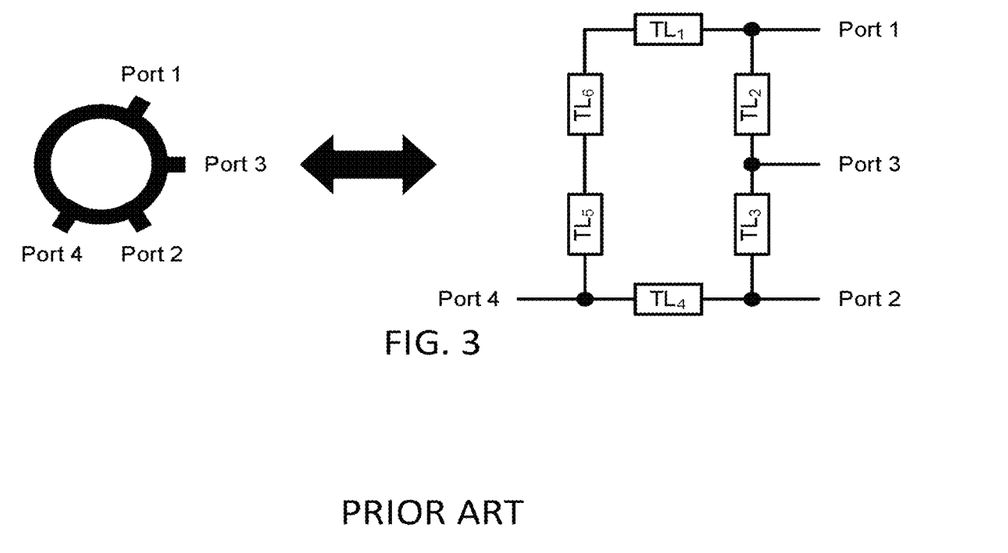
FIG. 3 shows a known rat-race coupler.

FIG. 2 shows a known STAR system wherein a rat race coupler is used instead of the hybrid coupler of FIG. 1. In this system, the fourth port of the rat-race coupler is again terminated with a variable resistance $Z_v$. Again, $Z_V$'s function is to produce a correction signal ($V_{ZV}$) with the appropriate amplitude and phase to cancel the self-interference. I FIG. 3 shows an equivalent view of a rat race coupler where the six transmission line (TL) sections that make up the rat race are clearly visible. Rat race couplers are composed of six transmission lines (TL) each a quarter wavelength long and with an impedance $\sqrt{2}$ times the system impedance. The system impedance is usually 50Ω, so the TLs have an impedance of 71Ω. A signal presented to Port 1 will be split between two paths, one via Port 3 and a second via Port 4. Due to a 180° phase difference between the paths, they will combine in antiphase at Port 2 and be cancelled. $Z_v$ is adjusted so that its reflection $V_{ZV}$ cancels with the antenna mismatch $V_{ANT}$ at Port 2.

The challenge with any full duplex system where a high RF self-interference cancellation (SiC) is required, is to be able to cancel $V_{ANT}$ to a sufficiently large degree over a wide bandwidth at the LNA input. Therefore, $V_{ZV}$ should be tuneable over the range of magnitude and phases likely to be produced by $V_{ANT}$, given the operating conditions and frequency of the system.

Available architectures based on a $Z_v$ tend to be physically large as they require additional circuitry to the coupler. The insertion loss of the components used for $Z_v$ and the mismatch from their ports limit the range over which $V_{ZV}$ can be tuned.

Figure 4:
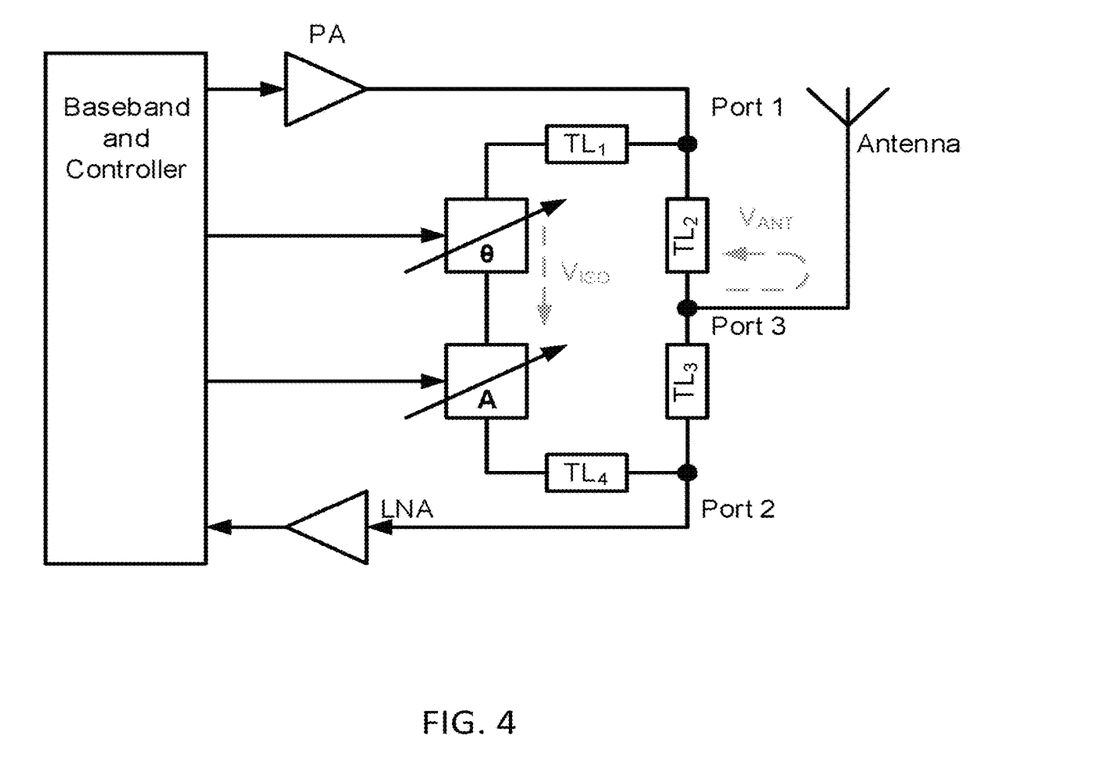
FIG. 4 shows a FD system of an embodiment.

FIG. 4 shows an embodiment of the present application, wherein a full duplex system incorporates a tuneable rat-race coupler. The antenna is coupled to Port 3 of the tuneable rat-race coupler. The output of the power amplifier (PA), which supplies the signal ($V_{PA}$) to be transmitted via the antenna, is coupled to Port 1 of the tuneable rat-race coupler. Port 2 of the tuneable rat-race coupler outputs a signal received via the antenna. Port 2 may be coupled to an amplifier, such as a low-noise amplifier (LNA). In an embodiment, the transmission lines $TL_1$, $TL_2$, $TL_3$, and $TL_4$ are each a quarter wavelength long. In an embodiment, they each have an impedance $\sqrt{2}$ times the system impedance. However, transmission lines with alternative lengths (in wavelengths) and impedances may be used.

In the embodiment of FIG. 4, $Z_v$ of previous FIG. 2 is replaced with a variable attenuator A and variable phase shifter θ. The variable attenuator A and variable phase shifter θ are integrated into one of the arms of the tuneable rat-race coupler. In particular, the variable attenuator A and variable phase shifter θ are integrated into an arm to replace Port 4 of the rat-race coupler and transmission lines $TL_5$ and $TL_6$ (shown in FIG. 3).

As a result, the tuneable rat-race coupler of FIG. 3 may be considered to comprise three arms. A first arm lies between Port 1 and Port 3 comprising a transmission line $TL_2$. A second arm lies between Port 3 and Port 2 comprising a transmission line $TL_3$. A third arm lies between Port 1 and Port 2 comprising a transmission line $TL_1$, a transmission line $TL_4$, the variable attenuator A and the variable phase shifter θ.

Referring to the embodiment of FIG. 4, a signal applied from the PA ($V_{PA}$) to Port 1 is split into two signal paths, one via $TL_2$ and the other via $TL_1$. The signal via $TL_2$ is coupled to the antenna at Port 3. A portion of that signal ($V_{ANT}$) is reflected at Port 3 due to the impedance mismatch of the antenna.

The signal via $TL_1$ is phase shifted and attenuated by the variable attenuator A and the variable phase shifter θ to produce a cancellation signal $V_{ISO}$. By adjusting the variable attenuator A and variable phase shifter θ a cancellation signal Visa, with the appropriate magnitude (or amplitude) and phase to cancel the reflected, or self-interference, signal $V_{ANT}$ at Port 2 is generated. In particular, Visa is equal in magnitude (or amplitude) but 180° out of phase with the reflected signal $V_{ANT}$.

In an embodiment, the 180° phase difference between $V_{ISO}$ and $V_{ANT}$ is achieved by a combination of the phase shift associated with the transmission lines $TL_1$-$TL_4$ and the phase shift provided by the variable phase shifter θ.

For example, with respect to a signal applied to Port 1 by the PA ($V_{PA}$), $V_{ANT}$ will be phase shifted due to $TL_2$ ($\varphi_{TL_2}$), the reflection ($\varphi_{reflect}$) at Port 3, and $TL_3$ ($\varphi_{TL_3}$). With respect to a signal applied to Port 1 by the PA ($V_{PA}$), $V_{ISO}$ will be phase shifted due to $TL_1$ ($\varphi_{TL_1}$), $TL_4$ ($\varphi_{TL_4}$) and the variable attenuator A and variable phase shifter ($\theta_{\varphi_\theta}$)

Therefore, in order for $V_{ISO}$ to lag behind $V_{ANT}$ by 180°

$$\varphi_{TL_1}+\varphi_{TL_4}+\varphi_\theta=\varphi_{TL_2}+\varphi_{reflect}+\varphi_{TL_3}+180°$$

In an embodiment, the transmission lines are equal in length. For example, one quarter wavelength, and thus contribute 90° phase shift each. In this embodiment, the phase shift provided by the variable attenuator A and variable phase shifter θ ($\varphi_\theta$) is equal to 180°+$\varphi_{reflect}$ so that the $V_{ISO}$ and $V_{ANT}$ signal cancel at Port 2. $V_{ISO}$ lags behind $V_{ANT}$ by 180°.

In an embodiment, the variable attenuator A and the variable phase shifter θ, at their centre value, have a length in wavelengths of 2λ/4 combined so that they provide a phase shift of 180°.

In an embodiment, the lengths of the transmission lines and the variable attenuator A and the variable phase shifter θ are such that $V_{ISO}$ leads $V_{ANT}$ by 180°.

The tuneable rat-race coupler provides a compact layout for systems requiring the combination, splitting and/or cancellation of signals, such as the full duplex system of FIG. 4, because it replaces the need for two separate components—a rat-race coupler with a separate $Z_v$.

Advantageously, this configuration allows the full duplex system to have its central frequency tuned over a wide tuning range as well as allowing for the cancellation of the reflected signal due to the antenna impedance mismatch.

In an embodiment, the combined loss of A and θ should be 6 dB.

Optionally, the system of FIG. 4 comprises a controller configured to control the variable attenuator A and variable phase shifter θ. The controller may be part of a digital base band that is responsible for modulating and demodulating the transmitted and received signals respectively. In an embodiment, the controller runs an algorithm to adapt the attenuator and phase shifter to minimise the power of the $V_{ISO}$ signal in the third arm and to maximise the self-interference cancellation (SiC).

Figure 5:
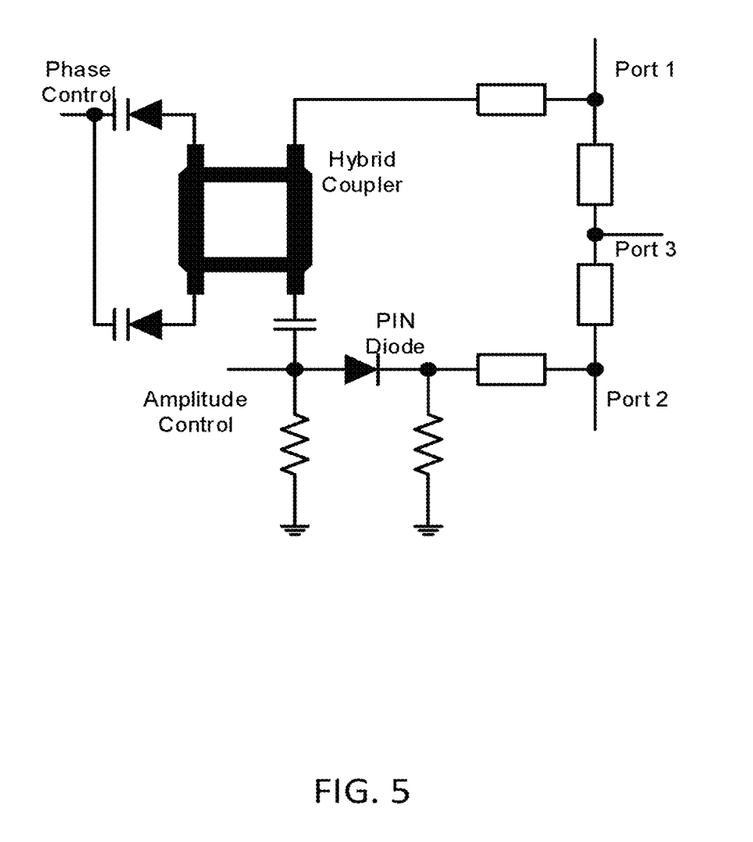
FIG. 5 shows a tuneable rat-race coupler of an example embodiment.
Figure 6:
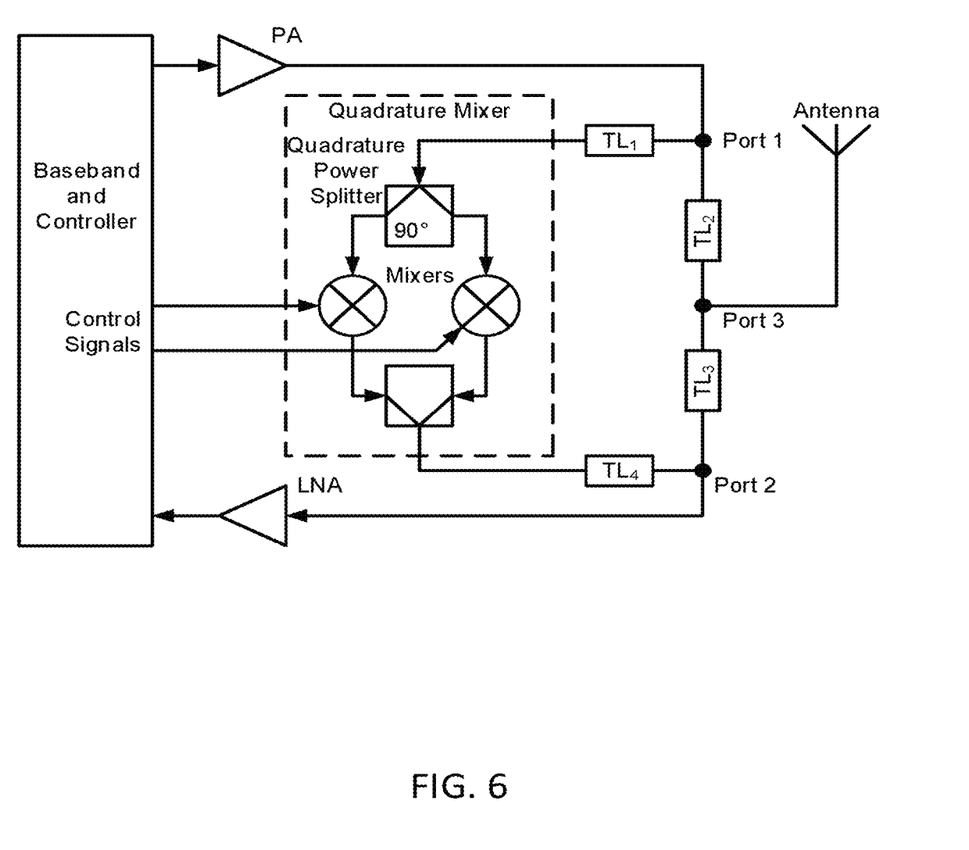
FIG. 6 shows a FD system of an embodiment.

The variable attenuator A and variable phase shifter θ shown in FIG. 4 can be implemented in a number of ways, some examples of which are shown in FIG. 5 and FIG. 6.

FIG. 5 illustrates an embodiment in which the variable attenuator A is a π type attenuator. The π type attenuator comprises two resistors an a PIN diode as the series element. The variable phase shifter A is based on a hybrid coupler with two of its ports terminated in varactor diodes. This arrangement is a low-loss solution. In particular, the use of the PIN diode as the series element in the 7 type attenuator reduces losses in comparison to solutions wherein the attenuator is based on a hybrid coupler with two of its ports connected to PIN diodes.

In an alternative embodiment, the variable attenuator A and variable phase shifter of FIG. 4 are replaced by the quadrature mixer shown in FIG. 6. The quadrature power splitter generates two signals that are 90 degrees out of phase. These two signals are individually multiplied with control signals provided by the controller. This is achieved using a mixer in each signal path. The signals are then recombined by another quadrature power splitter. The combined signal is fed back as $V_{ISO}$ to Port 2 of the tuneable rat-race combiner.

Figure 7:
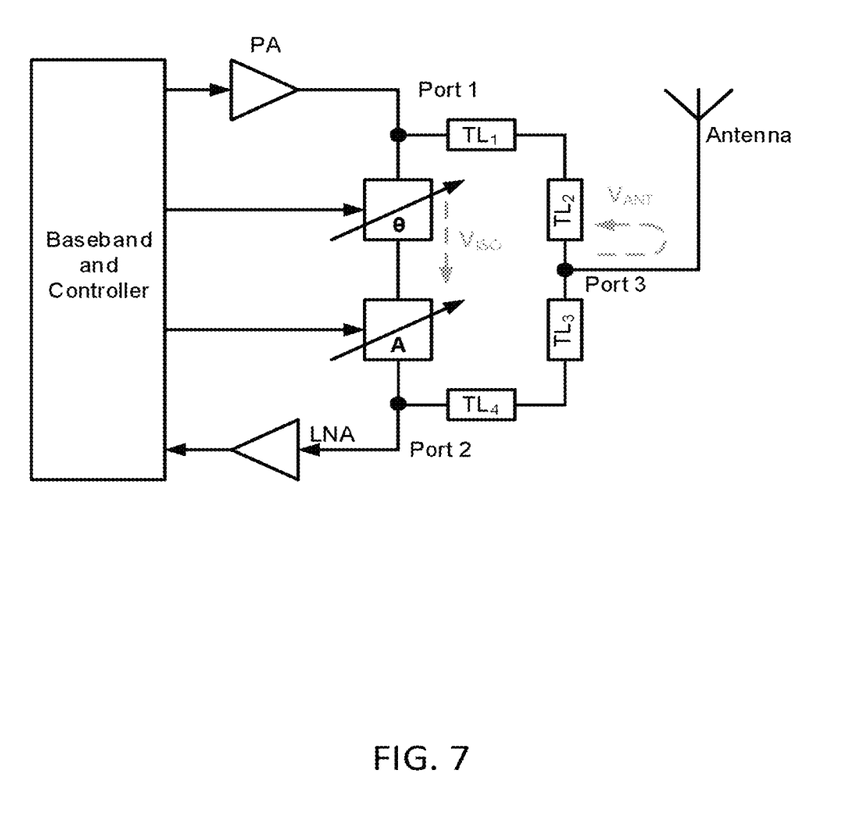
FIG. 7 shows a FD system of another embodiment.

In an embodiment, the mixers in the signal paths of the quadrature mixer are double-balanced mixers. These mixers have the ability to invert the polarity of the signal passing through them if the control signal has a negative polarity. FIG. 7 shows an alternative embodiment of the tuneable rat-race coupler. In this embodiment, the rat-race coupler of FIG. 4 is rearranged so that the first arm, between Port 1 and Port 3, comprises transmission line $TL_2$ and transmission line $TL_1$. A second arm lies between Port 3 and Port 2 comprising transmission line $TL_3$ and $TL_4$. A third arm lies between Port 1 and Port 3 comprising the variable attenuator A and the variable phase shifter θ.

Referring to the embodiment of FIG. 7, a signal applied from the PA to Port 1 ($V_{PA}$) is split into two signal paths, one via $TL_1$ and the other via variable attenuator A and the variable phase shifter θ. The signal via $TL_1$ is coupled to the antenna at Port 3. A portion of that signal ($V_{ANT}$) is reflected at Port 3 due to the impedance mismatch of the antenna.

The signal via the variable attenuator A and the variable phase shifter θ is phase shifted and attenuated to produce a cancellation signal $V_{ISO}$. By adjusting the variable attenuator A and variable phase shifter θ a cancellation signal $V_{ISO}$, with the appropriate magnitude (or amplitude) and phase to cancel the reflected, or self-interference, signal $V_{ANT}$ at Port 2 is generated. In particular, $V_{ISO}$ is equal in magnitude (or amplitude) but 180° out of phase with the reflected signal $V_{ANT}$.

In an embodiment, the 180° phase difference between $V_{ISO}$ and $V_{ANT}$ is achieved by a combination of the phase shift associated with the transmission lines $TL_1$-$TL_4$ and the phase shift provided by the variable phase shifter θ.

For example, in FIG. 7, with respect to a signal applied to Port 1 by the PA ($V_{PA}$), $V_{ANT}$ will be phase shifted due to $TL_1$ ($\varphi_{TL_1}$), $TL_2$ ($\varphi_{TL_2}$), the reflection (($\varphi_{reflect}$) at Port 3, $TL_3$ ($\varphi_{TL_3}$), and $TL_4$ ($\varphi_{TL_4}$). With respect to a signal applied to Port 1 by the PA ($V_{PA}$), $V_{ISO}$ will be phase shifted due to the variable attenuator A and variable phase shifter ($\theta_{\varphi_\theta}$)

Therefore, in order for $V_{ANT}$ to lag behind $V_{ISO}$ by 180°

$$\varphi_\theta = \varphi_{TL_1} + \varphi_{TL_2} + \varphi_{reflect} + \varphi_{TL_3} + \varphi_{TL_4} - 180°$$

In an embodiment, the transmission lines are equal in length. For example, one quarter wavelength, and thus contribute 90° phase shift each. In this embodiment, the phase shift provided by the variable attenuator A and variable phase shifter θ ($\varphi_\theta$) is equal to $180° + \varphi_{reflect}$ so that the $V_{ISO}$ and $V_{ANT}$ signal cancel at Port 2. $V_{ANT}$ lags behind $V_{ISO}$ by 180°.

In an embodiment, the variable attenuator A and the variable phase shifter θ, at their centre value, have a length in wavelengths of 2λ/4 combined so that they provide a phase shift of 180°.

In an embodiment, the lengths of the transmission lines and the variable attenuator A and the variable phase shifter θ are such that $V_{ANT}$ leads $V_{ISO}$ by 180°.

The embodiments of the variable attenuator A and variable phase shifter A shown in FIG. 5 and FIG. 6 can be incorporated into the embodiment of FIG. 7.

Figure 8:
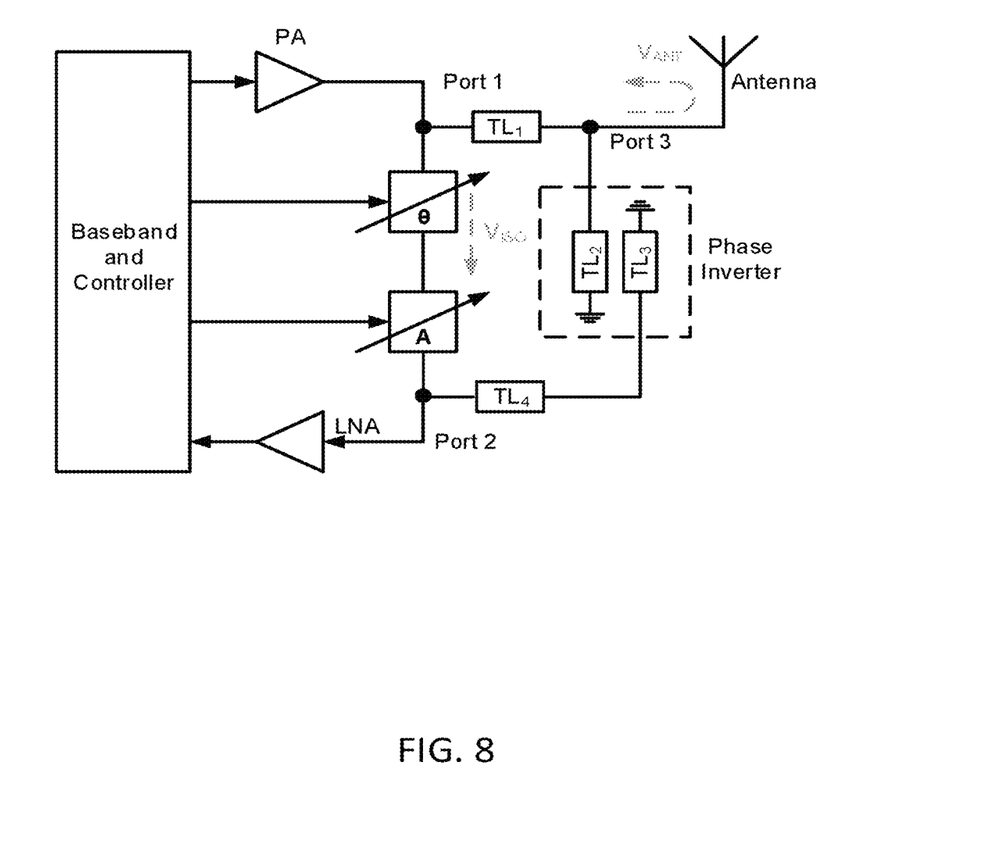
FIG. 8 shows a FD system of another embodiment.

Rat-race couplers can have their bandwidth extended by replacing two of the transmission lines with a phase-inverter as shown in FIG. 8. The phase-inverter of FIG. 8 provides 180° over a wide bandwidth. The phase-inverter can be a wound transformer or two closely coupled shorted quarter wavelength lines as shown in FIG. 8.

Figure 9:
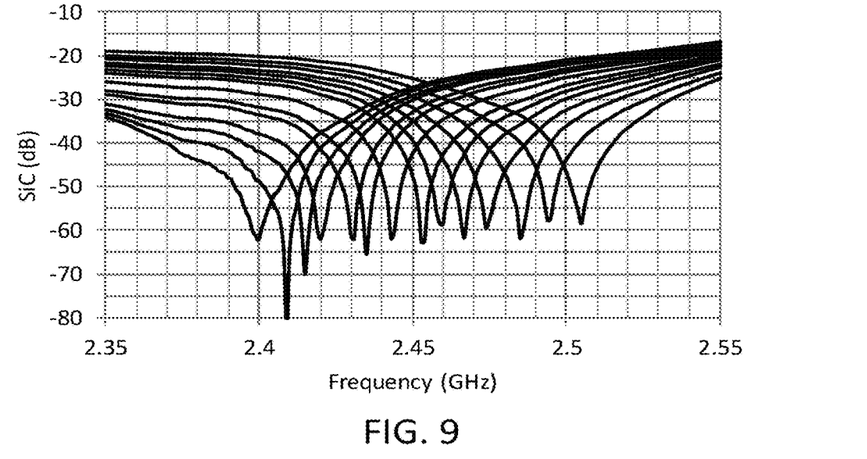
FIG. 9 shows simulated Self Interference Cancellation achieved by an embodiment.

FIG. 9 shows simulated results for the embodiment of FIG. 3 with the attenuator and phase shifter of FIG. 5. The measurements were taken with a realistic antenna on Port 3. FIG. 9 illustrates that a high degree of self-interference cancellation (SiC) can be tuned over the whole of the 2.45 GHz ISM band.

Figure 10:
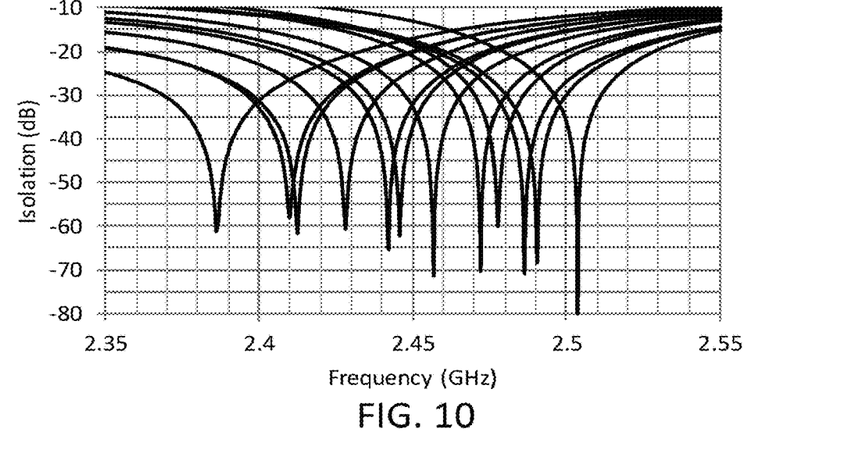
FIG. 10 shows measured isolation achieved by an embodiment.

FIG. 10 shows measured isolation results for the embodiment of FIG. 3 with the attenuator and phase shifter of FIG. 5. The measurements were taken with a realistic antenna on Port 3.

Figure 11:
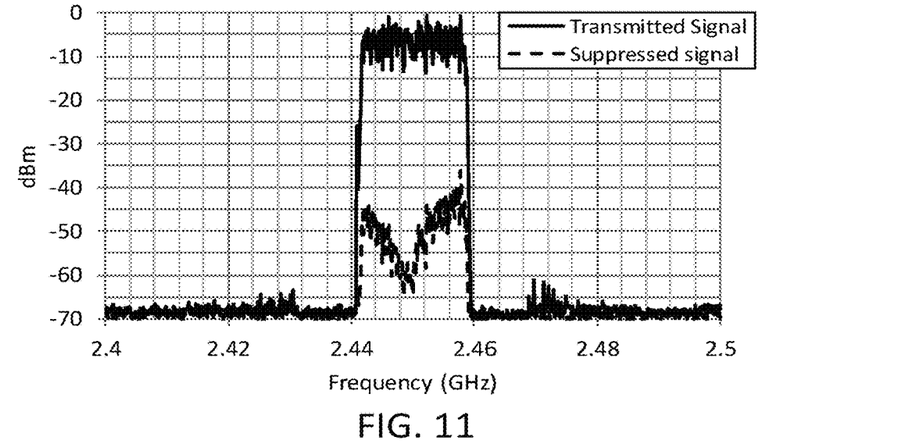
FIG. 11 shows measured Signal Suppression achieved by an embodiment.

FIG. 11 shows suppression of a 20 MHz WiFi signal by a practical implementation in a full duplex injection loop. These results indicate that embodiments of the present invention can achieve −42 dB of average self-interference cancellation (SiC) over a 20 MHz bandwidth Wi-Fi signal.

Although measurements for the results shown in FIG. 9 to FIG. 11 were taken in the 2.45 GHz Industrial, Medical and Scientific (ISM) band, the presented embodiments are scalable to higher frequencies and output powers to meet other applications, including wireless power transfer, mmWave backhaul and radar.

Embodiments of the present invention disclosed here offer a greater tuning range than those presented elsewhere. Its reduced physical dimensions compared to other work lend it well to incorporation in MIMO and other high density systems like phase array radar.

Whilst certain embodiments have been described, these embodiments have been presented by way of example only, and are not intended to limit the scope of the inventions. Indeed, the novel devices, and methods described herein may be embodied in a variety of other forms; furthermore, various omissions, substitutions and changes in the form of the devices, methods and products described herein may be made without departing from the spirit of the inventions. The accompanying claims and their equivalents are intended to cover such forms or modifications as would fall within the scope and spirit of the inventions.

The invention claimed is:

1. A full duplex system comprising:
a tuneable rat-race coupler with a first port connected to an antenna,
a second port connected to a source of a signal to be transmitted via the antenna,
a third port for outputting a signal received via the antenna, the tuneable rat-race coupler comprising a plurality of arms, and
a variable phase shifting and attenuation circuitry in a first arm of the plurality of arms to enable cancellation at the third port of a reflected signal produced by the antenna.

2. The full duplex system of claim 1, wherein the variable phase shifting and attenuation circuitry is configured to produce a cancellation signal that is equal in magnitude but opposite in phase to the reflected signal so that the signals cancel at the third port of the tuneable rat-race coupler.

3. The full duplex system of claim 1, wherein the variable phase shifting and attenuation circuitry comprises a n-type attenuator.

4. The full duplex system of claim 1, wherein the variable phase shifting and attenuation circuitry comprises a hybrid coupler.

5. The full duplex system of claim 1, wherein the variable phase shifting and attenuation circuitry comprises a quadrature mixer.

6. The full duplex system of claim 1, wherein the rat-race coupler comprises a phase-inverter.

7. The full duplex system of claim 1, further comprising control circuitry connected to the variable phase shifting and attenuation circuity.

8. The full duplex system of claim 1, further comprising a controller configured to control the variable phase shifting and attenuation circuitry.

9. The full duplex system of claim 1, wherein the system is a mobile phone, a WiFi router, a mobile phone basestation, a wireless power transfers system or a mmWave wireless backhaul.

10. A full duplex MIMO system comprising two or more full duplex systems as claimed in claim 1.

11. A tuneable rat-race coupler comprising:
a first port configured to be connected to a source of a first signal,
a second port configured to output the first signal and to receive a second signal,
a third port configured to output the second signal, a plurality of arms, and
a variable phase shifting and attenuation circuitry in a first arm of the plurality of arms to enable cancellation at the third port of a third signal generated at the second port.

12. The tuneable rat-race coupler of claim 11, wherein the variable phase shifting and attenuation circuitry is configured to produce a cancellation signal that is equal in magnitude but opposite in phase to the third signal so that the cancellation signal and third signal cancel at the third port.

13. The tuneable rat-race coupler of claim 11, wherein the variable phase shifting and attenuation circuitry comprises a π-type attenuator.

14. The tuneable rat-race coupler of claim 11, wherein the variable phase shifting and attenuation circuitry comprises a hybrid coupler.

15. The tuneable rat-race coupler of claim 11, wherein the variable phase shifting and attenuation circuitry comprises a quadrature mixer.

16. The tuneable rat-race coupler of claim 11, further comprising a phase-inverter.

17. The tuneable rat-race coupler of claim 11, wherein the variable phase shifting and attenuation circuitry is configured to be connected to control circuitry.

* * * * *